US012656817B2

(12) United States Patent
Jang

(10) Patent No.: US 12,656,817 B2
(45) Date of Patent: Jun. 16, 2026

(54) WEARABLE DEVICE INCLUDING RESIZING STRUCTURE

(71) Applicant: SAMSUNG ELECTRONICS CO., LTD., Suwon-si (KR)

(72) Inventor: Youngsang Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 146 days.

(21) Appl. No.: 18/437,348

(22) Filed: Feb. 9, 2024

(65) Prior Publication Data

US 2024/0345624 A1 Oct. 17, 2024

Related U.S. Application Data

(63) Continuation of application No. PCT/KR2024/000553, filed on Jan. 11, 2024.

(30) Foreign Application Priority Data

Apr. 12, 2023 (KR) ........................ 10-2023-0048440
Apr. 28, 2023 (KR) ........................ 10-2023-0056215

(51) Int. Cl.
*A44C 9/02* (2006.01)
*A44C 9/00* (2006.01)
*G06F 1/16* (2006.01)

(52) U.S. Cl.
CPC ............ *G06F 1/163* (2013.01); *A44C 9/0053* (2013.01)

(58) Field of Classification Search
CPC ...................................................... A44C 9/02
USPC ....................................... 63/15, 15.6, 15.65
See application file for complete search history.

(56) References Cited

U.S. PATENT DOCUMENTS

| | | | | |
|---|---|---|---|---|
| 2,745,265 A | * | 5/1956 | Grafstein | ................. A44C 9/02 |
| | | | | 63/15.6 |
| 2,778,207 A | * | 1/1957 | Thaler | ...................... A44C 9/02 |
| | | | | 63/15.6 |
| 7,150,164 B2 | | 12/2006 | Sills | |
| 9,495,575 B2 | | 11/2016 | Kim et al. | |

(Continued)

FOREIGN PATENT DOCUMENTS

| | | |
|---|---|---|
| CN | 109998238 A | 7/2019 |
| CN | 213695963 U | 7/2021 |

(Continued)

OTHER PUBLICATIONS

International Search Report corresponding to Application No. PCT/ KR2024/000553; Dated Apr. 22, 2024.

*Primary Examiner* — Jack W Lavinder
(74) *Attorney, Agent, or Firm* — CANTOR COLBURN LLP

(57) ABSTRACT

According to an embodiment, a wearable device includes a frame including a first surface facing a part of the body of a user when the wearable device is worn on the user, and a second surface opposite to the first surface, and a resizing structure on the first surface at least partially movable relative to the frame in response to pressure from the part of the body of the user. The resizing structure includes an elastic member which is deformable according to a shape of the part of the body of the user. The resizing structure includes a supporting member guiding a deformation of the elastic member by supporting the elastic member and extending from the first surface to cover at least a portion of the elastic member.

18 Claims, 12 Drawing Sheets

(56)        References Cited

U.S. PATENT DOCUMENTS

|  |  |  |  |
|---|---|---|---|
| 9,775,415 | B1 | 10/2017 | Humbert, Jr. et al. |
| 10,925,357 | B2 | 2/2021 | Zuluaga Escobar |
| 2011/0007035 | A1* | 1/2011 | Shai ...................... G06F 3/0304 |
|  |  |  | 345/179 |
| 2019/0091598 | A1* | 3/2019 | Milanesi ................. A63J 21/00 |

FOREIGN PATENT DOCUMENTS

|  |  |  |  |
|---|---|---|---|
| EP | 3787433 | B1 | 7/2024 |
| JP | 2008295526 | A | 12/2008 |
| KR | 20100087550 | A | 8/2010 |
| KR | 20160015050 | A | 2/2016 |
| KR | 101843100 | B1 | 3/2018 |
| KR | 20220060783 | A | 5/2022 |
| KR | 102499130 | B1 | 2/2023 |
| WO | 2019211777 | A1 | 11/2019 |
| WO | 2023281370 | A1 | 1/2023 |

* cited by examiner

WEARABLE DEVICE INCLUDING RESIZING STRUCTURE

CROSS-REFERENCE TO RELATED APPLICATION(S)

This application is a continuation application, claiming priority under § 365 (c), of International Application No. PCT/KR2024/000553, filed on Jan. 11, 2024, which is based on and claims the benefit of Korean Patent Application No. 10-2023-0048440 filed on Apr. 12, 2023, and Korean Patent Application No. 10-2023-0056215 filed on Apr. 28, 2023, and all the benefits accruing therefrom under 35 U.S.C. § 119, the disclosures of which are incorporated by reference herein in their entireties.

BACKGROUND

Technical Field

Embodiments to be described herein relate to a wearable device including a resizing structure.

Description of Related Art

A wearable device may be used in a state worn on a part of a body of a user. A wearable device may be provided in various types of products. For example, some wearable devices may include a ring shaped device wearable by a user on a part of the body of the user. In some cases, a wearable device may provide various functions to the user in order to meet the user's needs.

The above-described information may be provided as a related art for the purpose of aiding understanding of the present disclosure. No argument or decision has been made as to whether any of the above-described content may be applied as prior art related to the present disclosure.

SUMMARY

According to an embodiment, a wearable device may comprise a frame including a first surface facing a part of a body of a user when the wearable device is worn on the user, and a second surface opposite to the first surface. The wearable device may comprise a resizing structure on the first surface at least partially movable relative to the frame in response to pressure from the part of the body of the user. The resizing structure may include an elastic member which is deformable according to a shape of the part of the body of the user. The resizing structure may include a supporting member guiding a deformation of the elastic member by supporting the elastic member. The supporting member extends from the first surface to cover at least a portion of the elastic member.

According to an embodiment, a wearable device may comprise a frame including a first surface facing a part of a body of a user when the wearable device is worn on the user, and a second surface opposite to the first surface. The wearable device may comprise a resizing structure on the first surface at least partially movable relative to the frame in response to pressure from the part of the body of the user. The wearable device may comprise a supporting structure extending from the resizing structure. The wearable device may comprise a battery between the supporting structure and the first surface. The resizing structure may include an elastic member which is deformable according to a shape of the part of the body of the user. The resizing structure may include a supporting member guiding a deformation of the elastic member by supporting the elastic member. The supporting member extends from the first surface to cover at least a portion of the elastic member. The resizing structure may include at least one fastening member attached to the elastic member and configured to press the elastic member by contacting the part of the body of the user.

DETAILED DESCRIPTION

Figure 1:
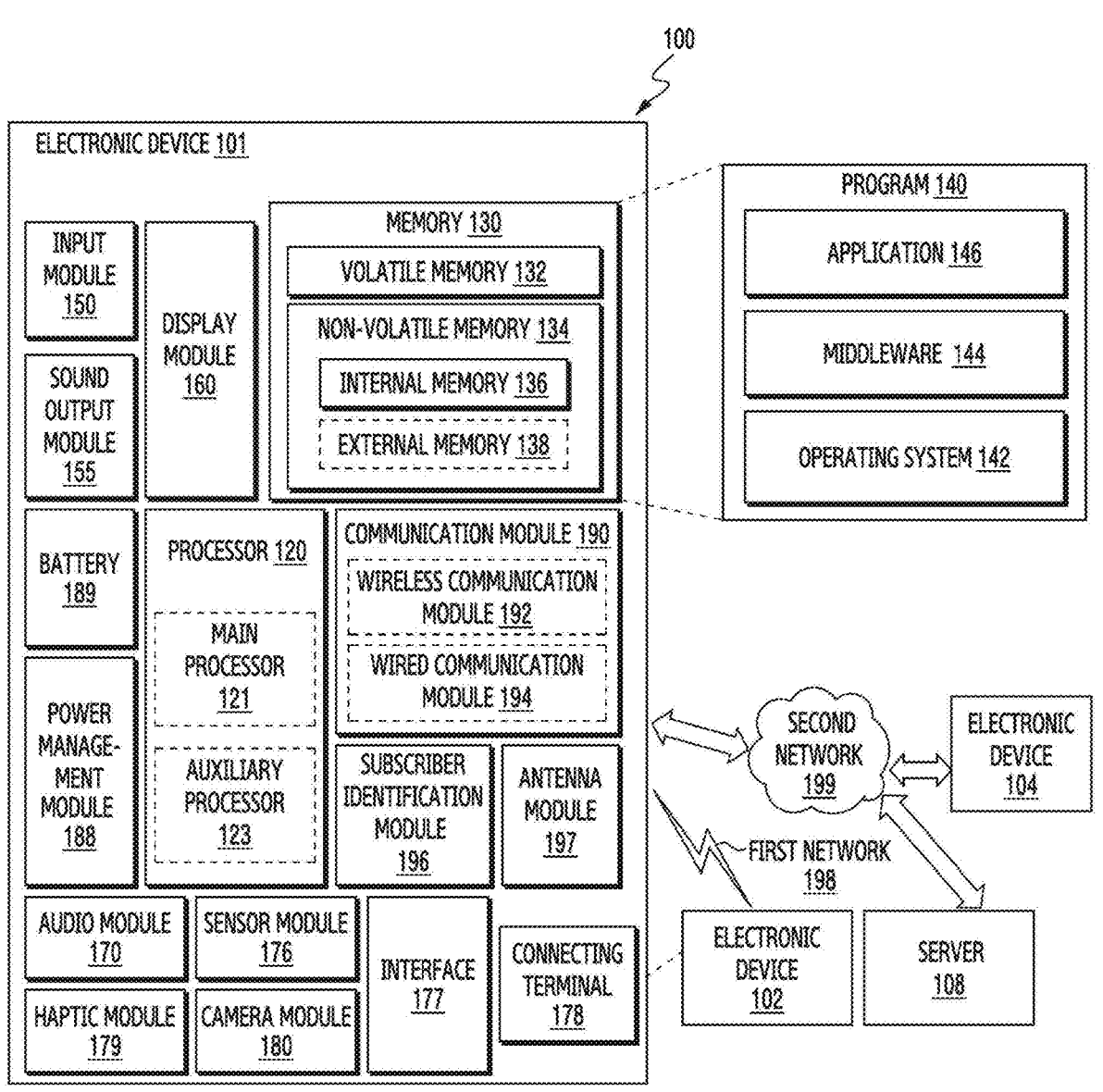
FIG. 1 is a block diagram of an electronic device in a network environment according to an embodiment.

Hereinafter, with reference to the drawings, embodiments of the present disclosure will be described in detail so that those having ordinary knowledge in the technical field to which the present disclosure pertains may easily implement it. However, the present disclosure may be implemented in many different forms and is not limited to the embodiments described herein. In relation to the description of the drawings, identical or similar reference numerals may be used for identical or similar components. In addition, in drawings and related descriptions, descriptions of well-known functions and configurations may be omitted for clarity and brevity.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
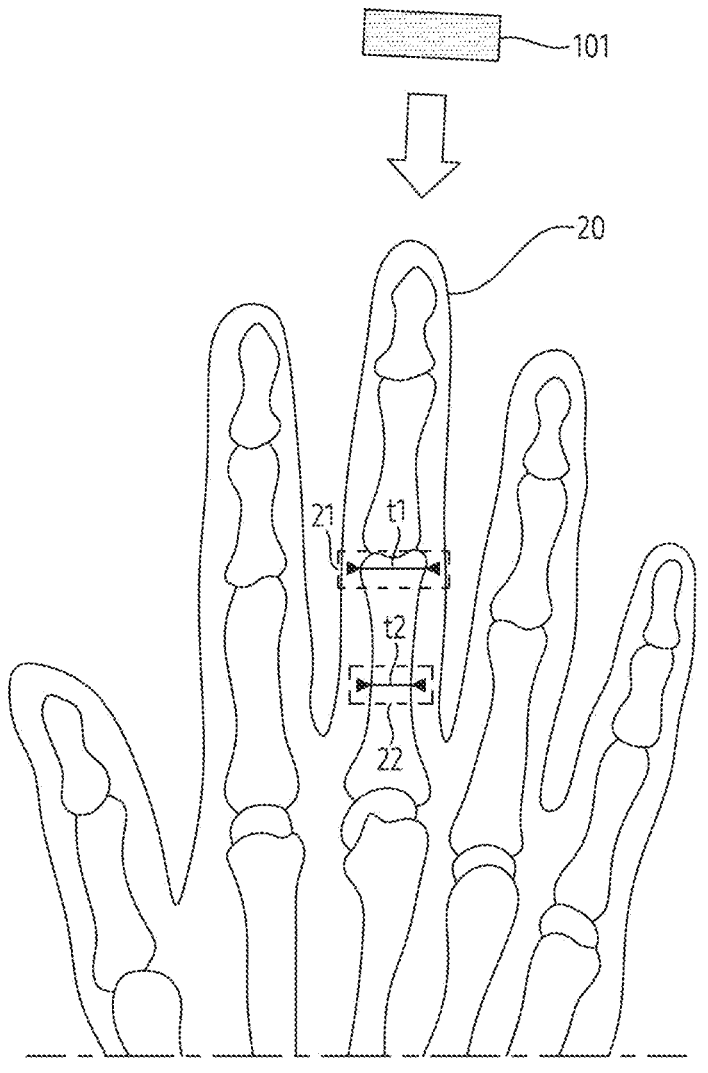
FIG. 2A illustrates that an exemplary electronic device is worn by a user.
Figure 2B:
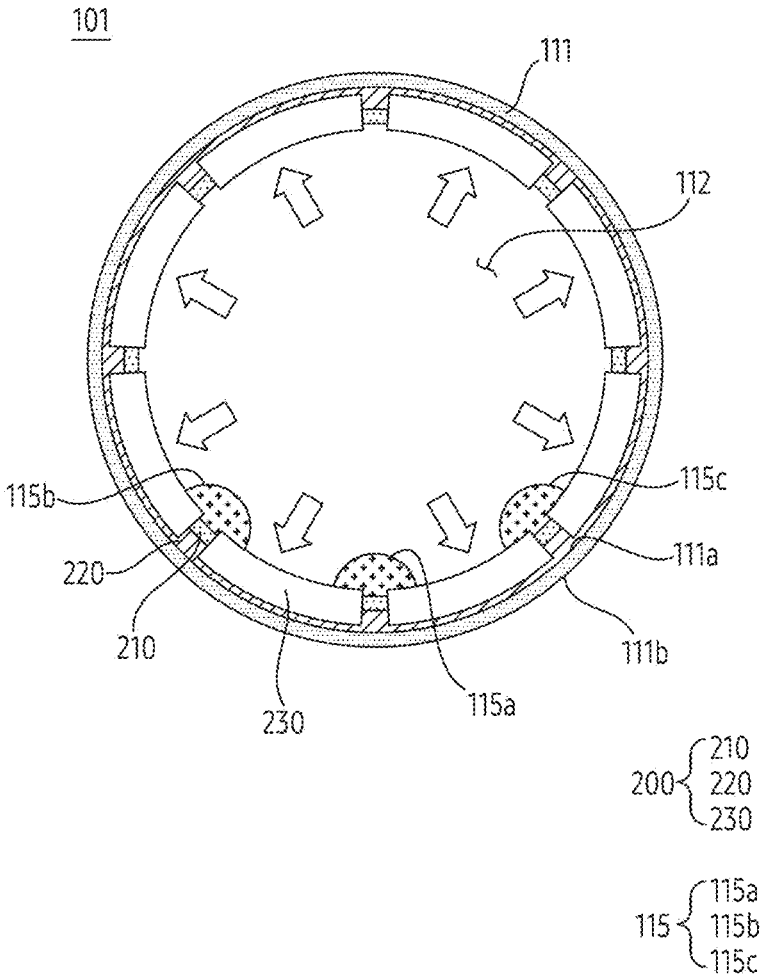
FIG. 2B is a top plan view of an exemplary electronic device.
Figure 2C:
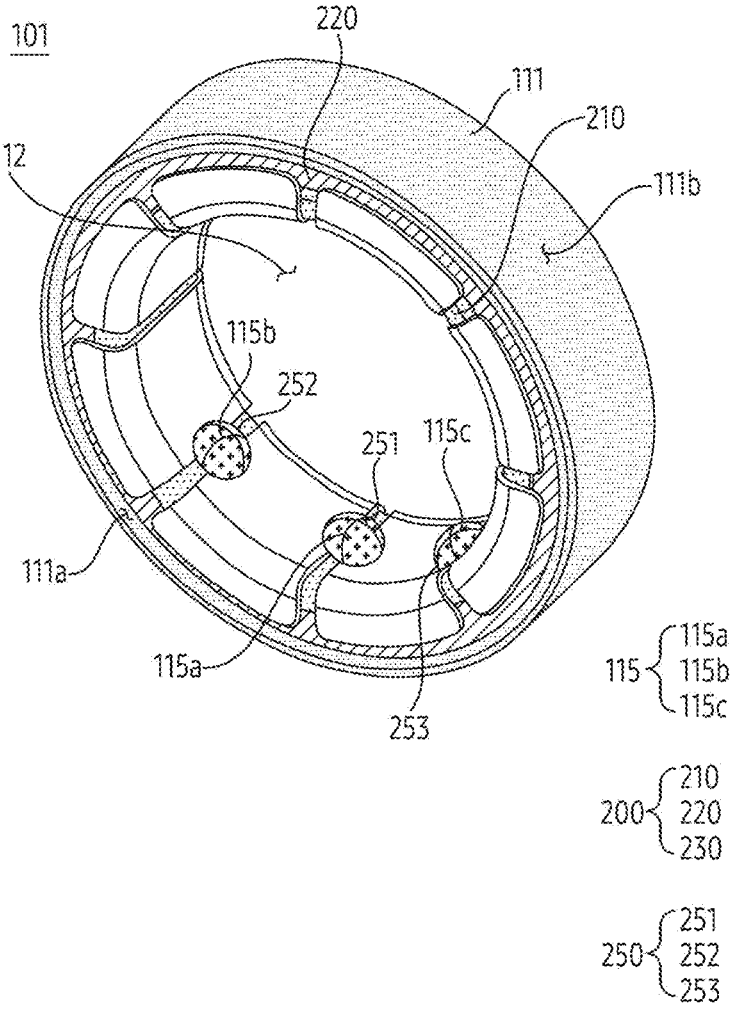
FIG. 2C is a perspective view of an exemplary electronic device.
Figure 2D:
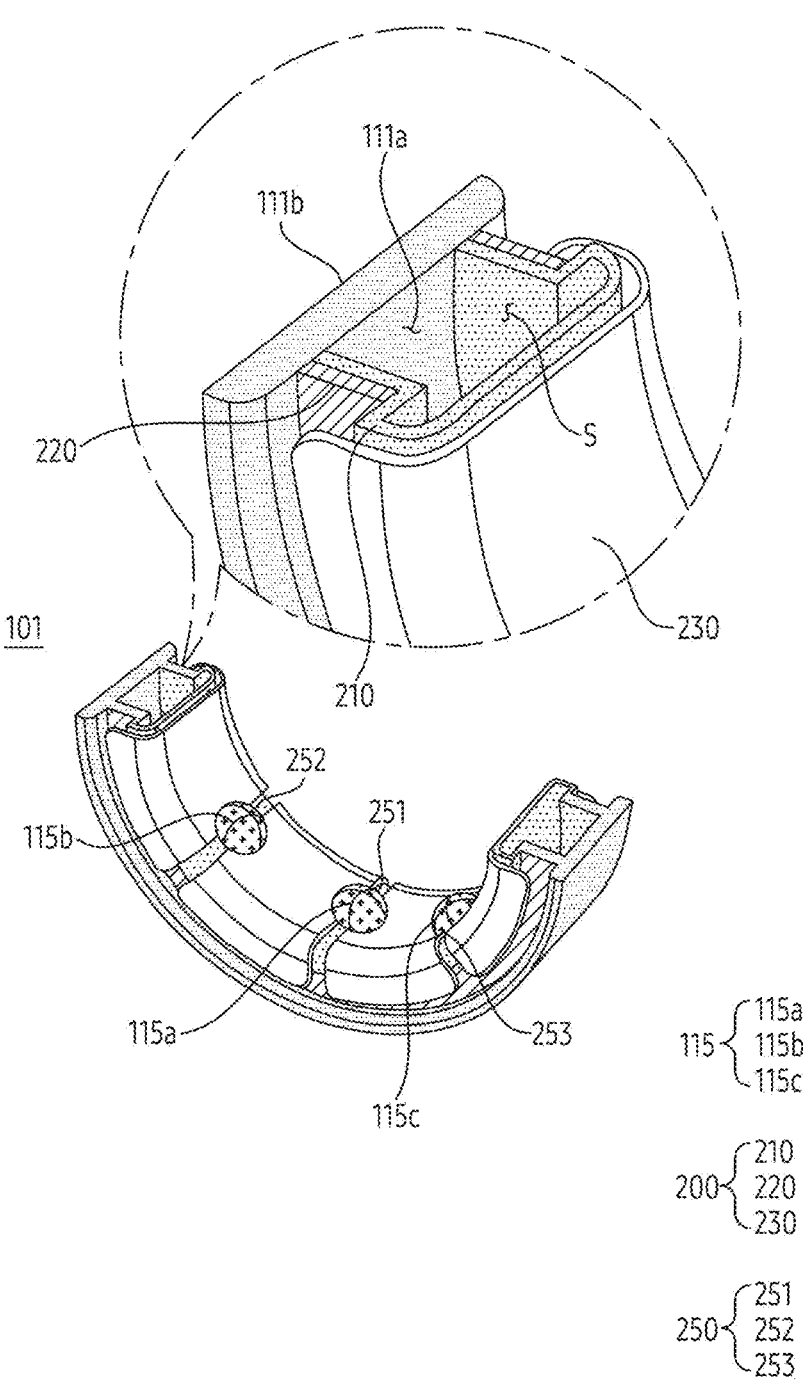
FIG. 2D is an enlarged view illustrating that a portion of an exemplary electronic device of FIG. 2C cut away.

FIG. 2A illustrates that an exemplary electronic device is worn by a user. FIG. 2B is a top plan view of an exemplary electronic device. FIG. 2C is a perspective view of an exemplary electronic device. FIG. 2D is an enlarged view illustrating that a portion of an exemplary electronic device of FIG. 2C cut away.

Referring to FIGS. 2A, 2B, 2C, and 2D, an electronic device 101 may include a frame 111 and a resizing structure 200 (also referred to herein as a sizing structure). The resizing structure 200 may include an elastic member 210 and a supporting member 220.

According to an embodiment, the electronic device 101 may be referred to as a wearable device that may be worn by a user. The user may refer to a person wearing the electronic device 101. For example, the electronic device 101 may be worn on the part 20 of the body of the user. For example, the electronic device 101 may be secured around the part 20 of the body of the user. For example, the electronic device 101 may be detachable from the part 20 of the body of the user.

For example, the electronic device 101 may be in contact with the part 20 of the body of the user, by being worn by the user. For example, the electronic device 101 may be configured to obtain information related to the user through the part 20 of the body of the user, by being worn by the user. For example, the electronic device 101 may provide information indicating the condition of the user to the user, based on obtaining information related to the user. For example, the electronic device 101 may provide the information indicating the condition of the user to the user, by being configured to display the information indicating the condition of the user through a display module (e.g., a display module 160 of FIG. 1) of the electronic device 101 and/or an external electronic device (e.g., an electronic device 102 or an electronic device 104 of FIG. 1) electrically and/or wirelessly connected to the electronic device 101. However, embodiments supported by the present disclosure are not limited thereto.

For example, the part 20 of the body of the user on which the electronic device 101 is worn may be a finger of the user. For example, the electronic device 101 may have a ring shape such that the electronic device 101 may be worn on the finger of the user. However, embodiments supported by the present disclosure are not limited thereto. The electronic device 101, which may be referred to as the wearable device, may have a shape corresponding to the part 20 of the body of the user, in order to be worn on the part 20 of the body of the user.

For example, when referring to FIG. 2A, the thickness of the part 20 of the body of the user on which the electronic device 101 is worn may vary depending on the shape of the part 20 of the body of the user. For example, the electronic device 101 may pass through a first area 21 (e.g., the joint of the finger) of the part 20 of the body of the user and be worn on a second area 22 (e.g., the knuckle of the finger) of the part 20 of the body of the user. The electronic device 101 supports features for size adjustments according to the thickness of the part 20 of the body. For example, since a thickness t1 of the first area 21 is thicker than a thickness t2 of the second area 22, the electronic device 101 worn on the part 20 of the body may be required to adjust the size of the portion passing through the part 20 of the body the electronic device 101 according to the thickness of the part 20 of the body.

References to descriptions of the electronic device 101 passing through the part 20 of the body may refer to instances in which the electronic device 101 surrounds the part 20 of the body and passes an area (e.g., first area 21) associated with the part 20 of the body. References to descriptions of the electronic device 101 passing through the part 20 of the body may refer to the part 20 (e.g., finger) of the body passing through an opening (e.g., hole 112) of the electronic device 101.

According to an embodiment, the frame 111 may include a first surface 111a facing the part 20 of the body of the user when the electronic device 101 is worn by the user, and a second surface 111b opposite to the first surface 111a.

For example, the first surface 111a may surround the part 20 of the body of the user on which the electronic device 101 is worn. For example, the first surface 111a may be covered by the part 20 of the body of the user on which the electronic device 101 is worn. For example, the second surface 111b may form the exterior of the electronic device 101 together with the first surface 111a. For example, the second surface 111b may form a ring-shaped frame 111 together with the first surface 111a. For example, the second surface 111b may be a surface that does not face the part 20 of the body of the user, in case that the electronic device 101 is worn by the user. For example, when the electronic device 101 is worn by the user, the first surface 111a may be the closest surface to the part 20 of the body of the user among the frame 111. The second surface 111b, which is opposite to the first surface 111a, may be the furthest surface from the part 20 of the body of the user among the frame 111. For example, the first surface 111a may be referred to as the inner circumference surface of the frame 111. The second surface 111b, which is opposite to the first surface 111a, may be referred to as the outer circumference surface of the frame 111. However, embodiments supported by the present disclosure are not limited thereto.

According to an embodiment, the electronic device 101 may further include a hole 112 configured to be surrounded by the frame 111 and through which the part 20 of the body of the user may pass. For example, the hole 112 may be penetrated by the part 20 of the body of the user, for a case in which the electronic device 101 is worn by the user. For example, the size of the hole 112 may vary depending on the thickness of the part 20 of the body, in order to pass through the part 20 of the body of the user. Expressed another way, the electronic device 101 may support varying the size of the hole 112 according to the thickness of the part 20 of the body, such that the part 20 of the body of the user may pass through or penetrate the hole 112. The electronic device 101 may be configured to be secured to the part 20 of the body of the user, for a case in which the user wears the electronic device 101, by including the hole 112 configured to pass through the part 20 of the body of the user. Regarding the change in the size of the hole 112, it will be described herein.

According to an embodiment, the resizing structure 200 may be disposed on the first surface 111a of the frame 111. The resizing structure 200 may be at least partially movable relative to the frame 111 by being pressed by the part 20 of the body of the user. For example, the resizing structure 200 may be at least partially movable relative to the frame 111 in response to pressure (or force) applied toward the frame 111 by the part 20 of the body of the user.

For example, the resizing structure 200 may be in contact with the first surface 111a of the frame 111. For example, the resizing structure 200 may be extended from the first surface 111a of the frame 111. For example, the resizing structure 200 may be in contact with the part 20 of the body of the user when the electronic device 101 is worn on the user. The resizing structure 200 may be at least partially transformable by the part 20 of the body, by being in contact with the part 20 of the body of the user. For example, the resizing structure 200 may be configured such that the electronic device 101 is secured to the part 20 of the body of the user, for a case in which the electronic device 101 is worn on the part 20 of the body of the user by pressing against (e.g., by applying a force towards the part 20 of the body) (also referred to herein as pressurizing) the part 20 of the body of the user. The resizing structure 200 may reduce the electronic device 101 from being separated from the part 20 of the body of the user, by pressing against the part 20 of the body of the user. The resizing structure 200 may mitigate instances in which the electronic device 101 is separated from the part 20 of the body of the user, by pressing against the part 20 of the body of the user. Accordingly, for example, the features of the electronic device 101 described herein may reduce the electronic device 101 from slipping off of the part 20 of the body.

For example, the resizing structure 200 may form at least a portion of the hole 112 configured to pass through the part 20 of the body of the user. The resizing structure 200 may be pressed by the part 20 of the body of the user, when the hole 112 passes through the part 20 of the body of the user. The resizing structure 200 may be configured to adjust the size of the hole 112, by being moved relative to the frame 111 by the part 20 of the body of the user.

According to an embodiment, the elastic member 210 may be deformable according to the shape of the part 20 of the body of the user. For example, the elastic member 210 may be configured to move at least a portion of the resizing structure 200 relative to the frame 111, by being deformed by the part 20 of the body of the user. For example, the elastic member 210 may be configured to move at least a portion of the resizing structure 200 relative to the frame 111 based on a deformation of the third portion 213 by the part 20 of the body of the user. For example, at least a portion of the elastic member 210 may be movable relative to the frame 111 by the part 20 of the body of the user. For example, since the elastic member 210 has elasticity, and for a case in which the elastic member 210 is pressed by the part 20 of the body of the user, the clastic member 210 may be configured to apply pressure to the part 20 of the body of the user in a direction opposite to the direction of the pressure by the part 20 of the body of the user.

For example, the elastic member 210 may be elastically deformed, by being pressed by the part 20 of the body of the user. The elastic member 210 may be restored to a state before the pressure by the part 20 of the body of the user is applied to the clastic member 210, by releasing the pressure by the part 20 of the body of the user. For example, the elastic member 210 may adjust the size of the hole 112 such that the size of the hole 112 passing through the part 20 of the body of the user corresponds to the thickness (e.g., the thickness t1 of the first area 21 and the thickness t2 of the second area 22 of FIG. 2) of the part 20 of the body of the user, which varies according to the shape of the part 20 of the body of the user, by being transformed by the part 20 of the body of the user. Since the clastic member 210 has an clastic restoring force, the resizing structure 200 may be configured such that the electronic device 101 is secured to the part 20 of the body of the user by pressing against the part 20 of the body of the user.

According to an embodiment, the elastic member 210 may include at least one of rubber and silicone. The frame 111 may include titanium. However, embodiments supported by the present disclosure are not limited thereto.

According to an embodiment, the supporting member 220 may extend from the first surface 111a to cover at least a portion of the elastic member 210. The supporting member 220 may guide a deformation of the elastic member 210 by supporting the elastic member 210.

For example, the supporting member 220 may extend from the first surface 111a of the frame 111 toward the hole 112. For example, the supporting member 220 may protrude from the first surface 111a. For example, the supporting member 220 may be in contact with the first surface 111a. For example, the supporting member 220 may be attached on the first surface 111a. For example, the supporting member 220 may be formed along the edge of the first surface 111a. For example, the supporting member 220 may form at least portion of the exterior of the electronic device 101.

For example, the supporting member 220 may be in contact with at least a portion of the clastic member 210. For example, the supporting member 220 may be coupled with the elastic member 210. For example, the supporting member 220 may be connected to the elastic member 210. For example, the supporting member 220 may extend from at least a portion of the clastic member 210 to the first surface 111a. For example, the supporting member 220 may be formed integrally with the clastic member 210, through double injection molding with the clastic member 210.

For example, the supporting member 220 may surround at least a portion of the elastic member 210. For example, the supporting member 220 may guide the deformation of the remaining portion of the clastic member 210 and/or the movement of the remaining portion, by being coupled with a portion of the elastic member 210. For example, the supporting member 220 may cover the portion of the elastic member 210, by being coupled with a portion of the elastic member 210. The supporting member 220 may support the clastic member 210, by being coupled to the portion of the elastic member 210. The supporting member 220 may reduce the elastic member 210 from being separated from the supporting member 220 by the part 20 of the body of the user and may guide the deformation remaining portion of the elastic member 210 and/or the movement of the remaining portion, by being coupled with a portion of the elastic member 210.

Although the supporting member 220 has been described as having a separate configuration from the frame 111, embodiments supported by the present disclosure are not limited thereto. The supporting member 220 may be one element of the frame 111. For example, the supporting member 220 may be a portion extending from the first surface 111a of the frame 111 toward the hole 112 (or the part 20 of the body of the user for a case in which the electronic device 101 is worn on the part 20 of the body of the user), among the frame 111. For example, the material of the supporting member 220 may be substantially the same as the material of the frame 111. However, embodiments supported by the present disclosure are not limited thereto, and the supporting member 220 may be one element of the electronic device 101 that supports the elastic member 210, by covering at least a portion of the elastic member 210 from the first surface 111a of the frame 111.

According to an embodiment, the rigidity of the supporting member 220 may be greater than the rigidity of the elastic member 210. For example, the elastic member 210 may have flexibility. The supporting member 220 may support the elastic member 210 and may guide the deformation of the elastic member 210 as the rigidity of the supporting member 220 is greater than rigidity of the deformable elastic member 210.

According to an embodiment, the resizing structure 200 may further include at least one fastening member 230 configured to apply pressure to the elastic member 210, by being attached on the elastic member 210 and being in contact with the part 20 of the body of the user.

For example, the at least one fastening member 230 may cover at least a portion of the elastic member 210. For example, the at least one fastening member 230 may be movable relative to the frame 111 through the elastic member 210 in contact with the at least one fastening member 230. For example, the at least one fastening member 230 may apply pressure to the part 20 of the body of the user on which the electronic device 101 is worn, through the elastic restoring force of the elastic member 210 coupled to the at least one fastening member 230. The at least one fastening member 230 may be configured such that the electronic device 101 is secured to the part 20 of the body of the user, by pressing against the part 20 of the body of the user. The at least one fastening member 230 may reduce the electronic device 101 from being separated from the part 20 of the body of the user, by pressing against the part 20 of the body of the user through the elastic member 210.

For example, the at least one fastening member 230 may form at least a portion of the hole 112 configured to pass through the part 20 of the body of the user for a case in which the electronic device 101 is worn by the user. The at least one fastening member 230 may be movable relative to the frame 111 as the elastic member 210 in contact with the at least one fastening member 230 is deformed by the part 20 of the body of the user. As the at least one fastening member 230 moves relative to the frame 111, the size of the hole 112 may change. The at least one fastening member 230 may be configured such that the electronic device 101 is secured to the part 20 of the body of the user, by providing the hole 112 whose size changes according to the thickness of the part 20 of the body of the user.

According to an embodiment, the at least one fastening member 230 may be configured to move toward the first surface 111a or toward the part 20 of the body of the user by the deformation of the elastic member 210.

For example, the at least one fastening member 230 may apply pressure to the elastic member 210 in contact with the at least one fastening member 230, by being in contact with the part 20 of the body of the user. The elastic member 210 may be deformed by the pressure by the at least one fastening member 230. The at least one fastening member 230 may be configured to move toward the first surface 111a of the frame 111 by the deformation of the elastic member 210. For example, for a case in which the at least one fastening member 230 is moved toward the first surface 111a by deformation of the elastic member 210, the size of the hole 112 of the electronic device 101 may increase.

For example, the at least one fastening member 230 may be moved toward the part 20 of the body of the user on which the electronic device 101 is worn by the elastic restoring force of the elastic member 210 in contact with the at least one fastening member 230. The at least one fastening member 230 may apply pressure to the part 20 of the body of the user by moving toward the part 20 of the body of the user. For example, for a case in which the at least one fastening member 230 is moved toward the part 20 of the body of the user by the elastic restoring force of the elastic member 210, the size of the hole 112 of the electronic device 101 may decrease.

For example, in order for the electronic device 101 to be worn on the part 20 of the body of the user, while the part 20 of the body of the user passes through the hole 112, the thickness of the part 20 of the body of the user may vary. Expressed another way, in some cases, while the part 20 of the body of the user passes through the hole 112, the thickness of the part 20 of the body of the user may vary, and the electronic device 101 provide function for adjusting the size of the hole 112 to allow a part 20 of the body of the user to pass through the hole 112.

For example, the electronic device 101 may be worn in the second area 22 of the part 20 of the body of the user. The hole 112 of the electronic device 101 may pass through the first area 21 of the part 20 of the body of the user while the electronic device 101 is worn on the part 20 of the body of the user, in order to be worn on the second area 22. The at least one fastening member 230 may apply pressure to the elastic member 210 by being in contact with the first area 21 while the hole 112 passes through the first area 21. The elastic member 210 may move the at least one fastening member 230 toward the first surface 111a of the frame 111, by being deformed by the pressure by the at least one fastening member 230. The size of the hole 112 may be increased by the at least one fastening member 230 moved toward the first surface 111a to correspond to the thickness t1 of the first area 21.

For example, while the electronic device 101 is moved from the first area 21 to the second area 22 to be worn in the second area 22 of the part 20 of the body of the user, the thickness of the part 20 of the body of the user passing through the hole 112 of the electronic device 101 may become thinner. Since the thickness t2 of the second area 22 is thinner than the thickness t1 of the first area 21, the at least one fastening member 230 may be moved toward the part 20 of the body of the user by the elastic restoring force of the elastic member 210 in contact with the at least one fastening member 230. The size of the hole 112 may be reduced by the at least one fastening member 230 moved toward the part 20 of the body of the user to correspond to the thickness t2 of the second area 22.

According to an embodiment, the electronic device 101 may further include a space S covered by the frame 111 and the resizing structure 200. The volume of the space may be configured to be changeable by deformation of the elastic member 210.

For example, the space S may be sealed by the frame 111 and the resizing structure 200. For example, the space S may be at least partially formed by the elastic member 210 such that the volume of the space S changes according to deformation of the elastic member 210. For example, the space S may accommodate electronic components of the electronic device 101. The electronic device 101 may provide movement of the resizing structure 200 by the deformation of the elastic member 210 by including the space S whose volume is be changeable. Expressed another way, the changeable volume of the space S supports movement of the resizing structure 200 described herein.

According to an embodiment, the electronic device 101 may further include a sensor module (e.g., a sensor module 176 of FIG. 1) on the first surface 111a configured to detect the condition of the user by using the part 20 of the body of the user. For example, the sensor module 176 may be disposed between the first surface 111a and the resizing structure 200. For example, the sensor module 176 may be disposed in the space S covered by the frame 111 and the resizing structure 200. For example, the sensor module 176 may include at least one of an optical sensor or a heartrate measurement (HRM) sensor using photoplethysmography (PPG), but is not limited thereto. The sensor module 176 may be configured to provide information related to the condition to the user, based on the condition of the user detected by using the part 20 of the body of the user.

According to an embodiment, the electronic device 101 may further include a shielding member 115 disposed on the sensor module 176 and including at least one protrusion 115a, 115b, and 115c exposed to the outside for the sensor module 176. The resizing structure 200 may include at least one opening 250 penetrated by the at least one protrusion 115a, 115b, and 115c.

For example, the shielding member 115 may cover the sensor module 176. For example, at least a portion of the shielding member 115 may be disposed in the space S. The at least one protrusion 115a, 115b, and 115c may protrude from the portion of the shielding member 115 in the space S to the outside through the at least one opening 250. For example, the at least one opening 250 may be formed on a portion of the elastic member 210 forming the hole 112 and/or on a portion of the at least one fastening member 230.

For example, although not illustrated, the sensor module 176 may include a light emitting unit configured to emit light, and a light receiving unit configured to receive at least a portion of the light emitted from the light emitting unit. For example, the first protrusion 115a may be disposed on the light emitting unit of the sensor module. The first protrusion 115a may protrude to the outside through the first opening 251. Since the first protrusion 115a has a curved surface, the amount of light transmitted to the part 20 of the body of the user may be increased by refracting the light emitted from the light emitting unit. For example, the second protrusion 115b and the third protrusion 115c may be disposed on the light receiving unit of the sensor module 176. The second protrusion 115b and the third protrusion 115c may respectively be exposed to the outside through a second opening 252 and a third opening 253 that are spaced apart from each other. Since each of the second protrusion 115b and the third protrusion 115c has a curved surface, the light emitted from the light emitting unit and reflected by the part 20 of the body of the user may be condensed toward the light receiving unit. The sensor module 176 may detect the condition of the user by using light reflected by the part 20 of the body of the user and transmitted to the light receiving unit.

According to one or more embodiments, the electronic device 101 may provide the user with the holes 112 having various sizes corresponding to the thickness of the part 20 of the body of the user, by including the resizing structure 200 that is at least partially movable relative to the frame 111, according to the thickness of the part 20 of the body of the user on which the electronic device 101 is worn.

Figure 3A:
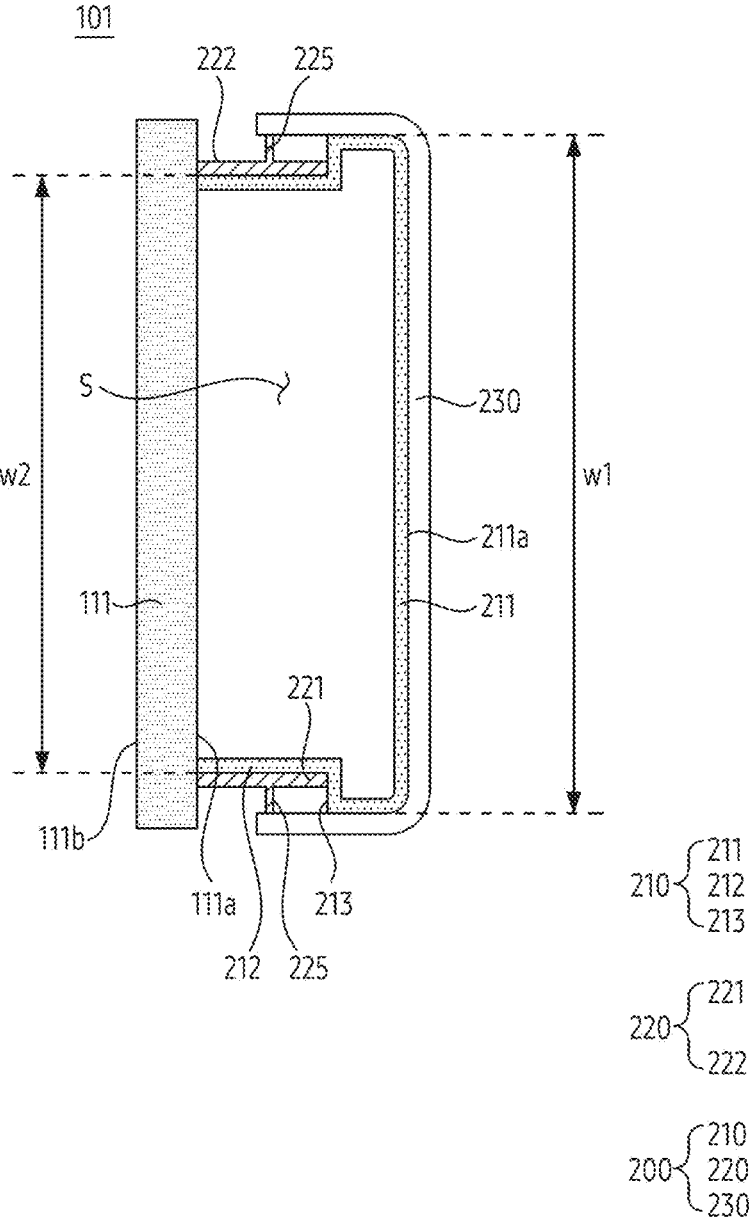
FIG. 3A is a cross-sectional view of an exemplary electronic device.
Figure 3B:
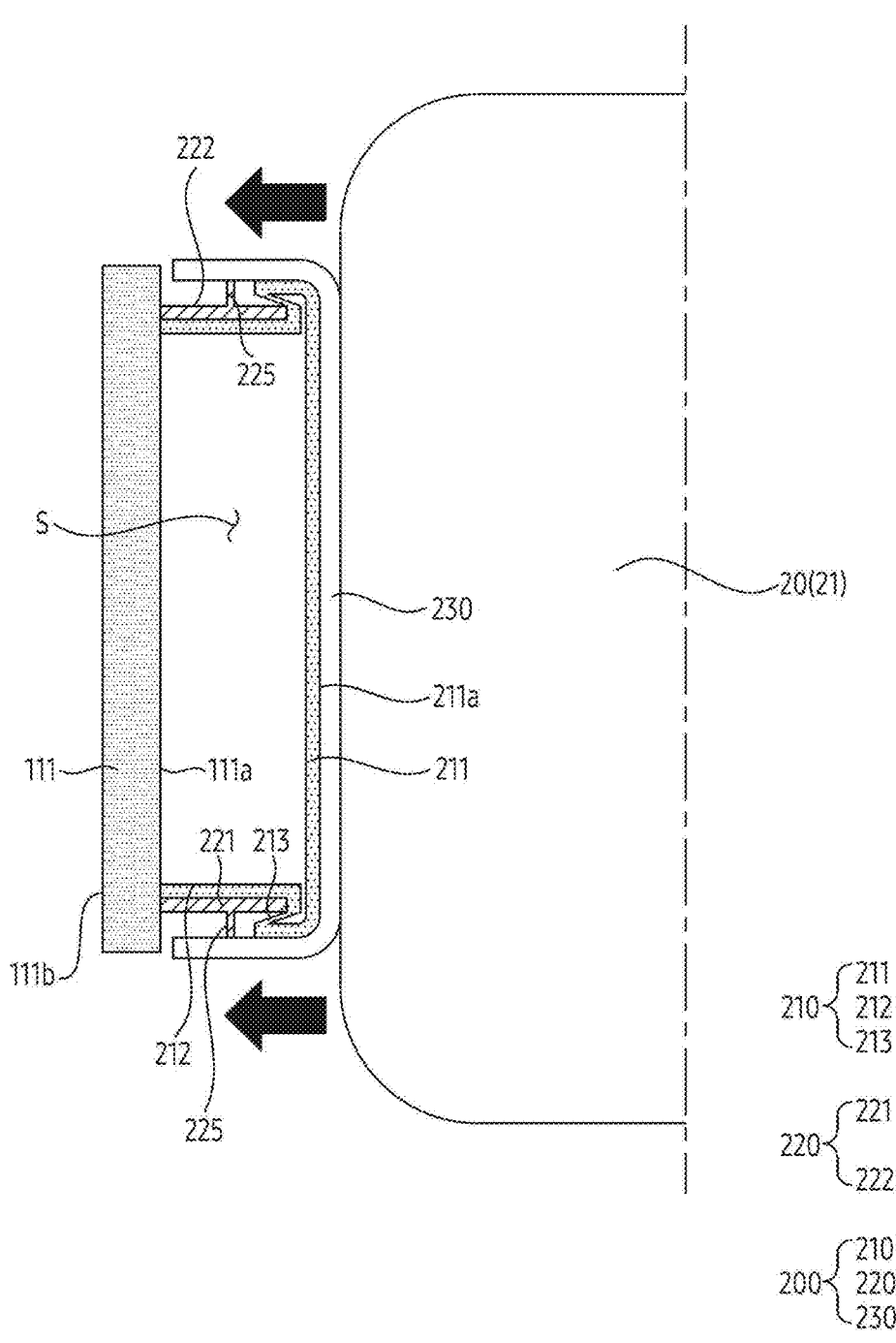
FIGS. 3B and 3C illustrate an operation of a resizing structure of an exemplary electronic device.
Figure 3C:
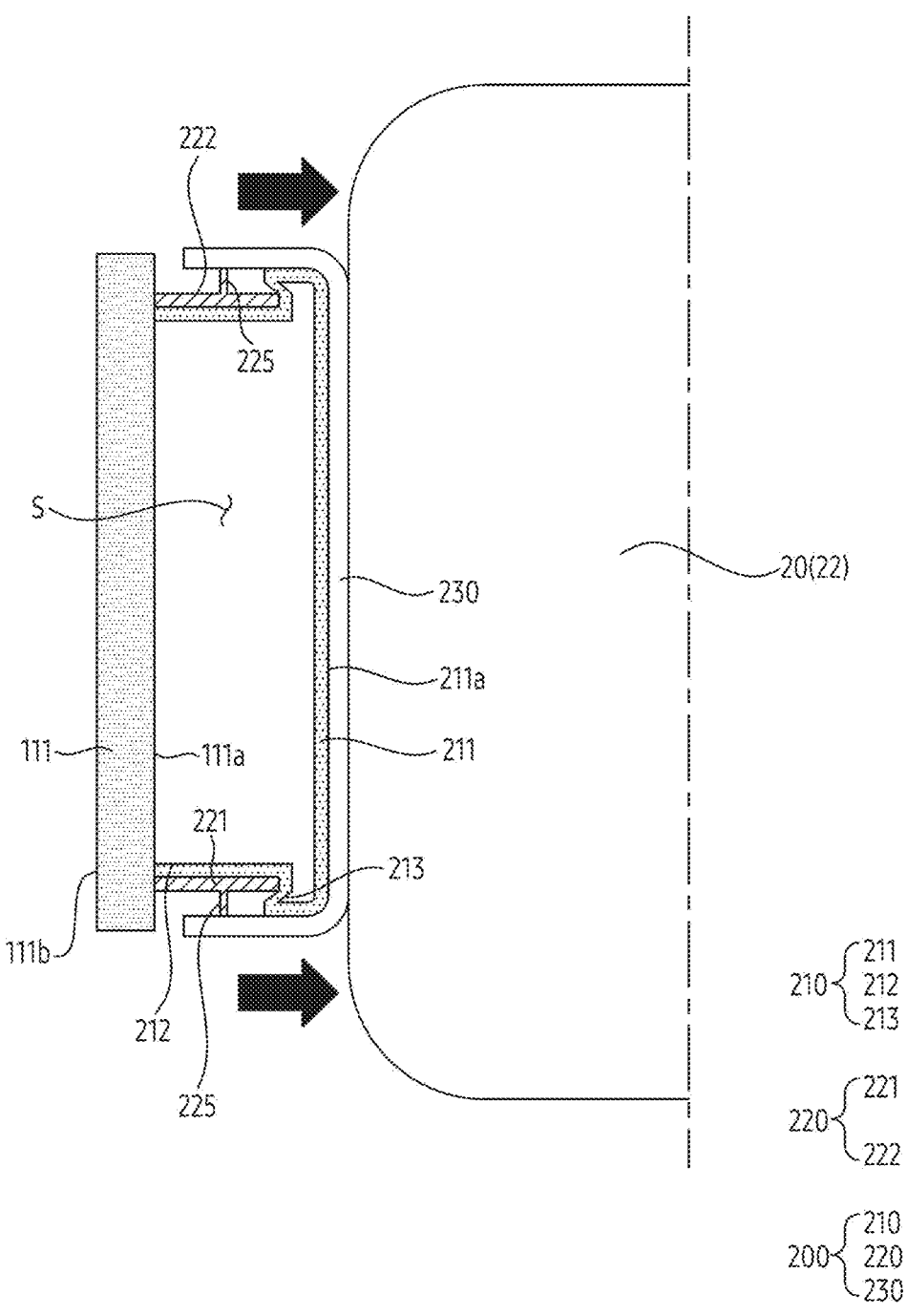

FIG. 3A is a cross-sectional view of an exemplary electronic device. FIGS. 3B and 3C illustrate an operation of a resizing structure of an exemplary electronic device.

Referring to FIGS. 3A, 3B, and 3C, an electronic device 101 may include a frame 111 including a first surface 111a facing a part 20 of a body of a user when worn by the user and a second surface 111b opposite to the first surface 111a. The electronic device 101 may include a resizing structure 200 on the first surface 111a that is at least partially movable relative to the frame 111 by being pressed by the part 20 of the body of the user. The resizing structure 200 may include an elastic member 210 that is deformable according to the shape of the part 20 of the body of the user, and a supporting member 220 that extends from the first surface 111a to cover at least a portion of the elastic member 210 and guides a deformation of the elastic member 210 by supporting the clastic member 210. According to an embodiment, the resizing structure 200 may further include at least one fastening member 230 attached on the elastic member 210, and configured to apply pressure to the elastic member 210 by being in contact with the part 20 of the body of the user.

Hereinafter, overlapping descriptions of the configurations described in FIGS. 2A, 2B, 2C, and 2D will be omitted.

According to an embodiment, the clastic member 210 may include a first portion 211, a second portion 212, and a third portion 213. The first portion 211 may be in contact with at least one fastening member 230. The second portion 212 is disposed inside the supporting member 220 and may be in contact with the supporting member 220. The third portion 213 may face the first surface 111a of the frame 111, by extending from the first portion 211 to the second portion 212.

For example, the first portion 211 may support the at least one fastening member 230. For example, the first portion 211 may be attached to the at least one fastening member 230. For example, the first portion 211 may be moved together with the at least one fastening member 230 that is moved by the part 20 of the body of the user, by being attached to the at least one fastening member 230. For example, the first portion 211 may include a third surface 211a to which the at least one fastening member 230 is attached (or seated) and which forms at least a portion of a hole (e.g., a hole 112 of FIG. 2B). The first portion 211 may reduce the at least one fastening member 230 from being separated from the elastic member 210, by providing the third surface 211a on which the at least one fastening member is seated.

For example, the second portion 212 may be covered by the supporting member 220. For example, the second portion 212 may be attached to the supporting member 220. For example, the second portion 212 may not be exposed to the outside by the supporting member 220. For example, the second portion 212 may fastened to the frame 111 by the supporting member 220, by being coupled with the supporting member 220. For example, the second portion 212 may be formed integrally with the supporting member 220 through double injection molding. However, embodiments supported by aspects of the present disclosure are not limited thereto. The clastic member 210 may reduce the elastic member 210 from being separated from the supporting member 220, by including the second portion 212 in contact with the supporting member 220. For example, the described attachment (e.g., coupling, integral formation) between the second portion 212 and the supporting member 220 may reduce the elastic member 210 from being separated from the supporting member 220.

For example, the third portion 213 may connect the first portion 211 and the second portion 212. For example, the third portion 213 may be a portion that is deformed by being pressed by the part 20 of the body of the user. For example, the third portion 213 may extend from the inside of the supporting member 220 toward the outside of the supporting member 220. For example, the third portion 213 may guide the movement of the first portion 211 by the part 20 of the body of the user, by using the second portion 212 in contact with the supporting member 220.

According to an embodiment, the third portion 213 of the elastic member 210 may be configured to move the at least one fastening member 230 in contact with the first portion 211 toward the first surface 111a of the frame 111 or toward the part 20 of the body, by being deformed according to the shape of the part 20 of the body of the user.

For example, referring to FIGS. 3A and 3B, the at least one fastening member 230 may be in contact with the part 20 of the body of the user, in order for the electronic device 101 to be worn on the part 20 of the body of the user. The electronic device 101 may pass a first area 21 having a thickness (e.g., a thickness t1 of FIG. 2A) greater than a thickness (e.g., a thickness t2 of FIG. 2A) of a second area 22, in order to be worn in the second area 22 among the part 20 of the body of the user. The third portion 213 of the elastic member 210 may be deformed, by pressing the at least one fastening member 230. For example, the part 20 of the body of the user may exert a pressure on the at least one fastening member 230, and the third portion 213 of the elastic member 210 may be deformed due to a resulting pressure between the third portion 213 and the at least one fastening member 230. By a deformation of the third portion 213, the first portion 211 extended from the third portion 213 may be moved toward the first surface 111a. As the first portion 211 is moved, the at least one fastening member 230 attached to the first portion 211 may be moved toward the first surface 111a. The volume of the space S covered by the frame 111 and the resizing structure 200 may be reduced.

For example, referring to FIGS. 3B and 3C, while the electronic device 101 passes through the first area 21 and is worn in the second area 22, the thickness of the part 20 of the body of the user may become thinner. Since the thickness of the part 20 of the body of the user becomes thinner, by the elastic restoring force of the third portion 213, the first portion 211 extending from the third portion 213 may be moved toward the part 20 of the body of the user. The volume of the space S covered by the frame 111 and the resizing structure 200 may increase. The at least one fastening member 230 may apply pressure to the part 20 of the body of the user, by being moved toward the part 20 of the body of the user by the elastic restoring force of the third portion 213.

According to an embodiment, a width w1 of the first portion 211 in contact with the at least one fastening member 230 may be greater than a width w2 of the second portion 212 in contact with the supporting member 220. For example, since the width w1 of the first portion 211 is greater than the width w2 of the second portion 212, the third portion 213 connecting the first portion 211 and the second portion 212 may be disposed on the supporting member 220. By being disposed on the supporting member 220, the third portion 213 may be deformed by the supporting member 220 when pressed by the part 20 of the body of the user. As the width w1 of the first portion 211 is greater than the width w2 of the second portion 212, the elastic member 210 may be configured to increase an area in which the at least one fastening member 230 may be seated and to guide the deformation of the elastic member 210 by the supporting member 220.

According to an embodiment, the supporting member 220 may include a guide structure 225 that faces the first surface 111a of the frame 111 by protruding from the supporting member 220 and guides the movement of the elastic member 210 according to the shape of the part 20 of the body of the user. For example, the guide structure 225 may face the third portion 213 of the elastic member 210 by protruding from the outer surface of the supporting member 220. For example, the guide structure 225 may be disposed between the first surface 111a and the third portion 213. For example, the first portion 211 and the third portion 213 of the elastic member 210 may be moved toward the first surface 111a, by being pressed by the part 20 of the body of the user. The guide structure 225 may provide an expansion and contraction range of the third portion 213 and may reduce damage to the elastic member 210 due to the pressure, by limiting the movement of the third portion 213 to the first surface 111a.

According to an embodiment, the electronic device 101 may further include the hole (e.g., the hole 112 of FIG. 2B) configured to be surrounded by the frame 111 and pass through the part 20 of the body of the user. The elastic member 210 may include the third surface 211a that forms at least a portion of the hole 112. The size of the hole 112 may be configured to be changeable by movement of a portion of the third surface 211a. For example, the third surface 211a may be a surface to which the at least one fastening member 230 of the first portion 211 of the elastic member 210 is attached. For example, the third surface 211a may form the hole 112 together with the at least one fastening member 230 attached to the third surface 211a. For example, the third surface 211a may change the size of the hole 112, by moving with the first portion 211 by the third portion 213 being deformed by the part 20 of the body of the user.

According to an embodiment, the supporting member 220 may include a first supporting member 221 and a second supporting member 222 that is spaced apart from the first supporting member 221 and faces the first supporting member 221. The elastic member 210 may extend from the first surface 111a between the first supporting member 221 and the second supporting member 222 to the third surface 211a forming at least a portion of the hole 112. For example, the elastic member 210 may be attached to the first surface 111a. For example, the elastic member 210 may include a portion (e.g., the second portion 212) disposed between the first supporting member 221 and the second supporting member 222. The supporting member 220 may reduce the elastic member 210 from being separated from the supporting member 220, by including the first supporting member 221 and the second supporting member 222. For example, the first supporting member 221 and the second supporting member 222 may prevent the elastic member 210 from being separated from the supporting member 220. The elastic member 210 may reduce the elastic member 210 from being separated from the frame 111, by extending from the first surface 111a of the frame 111. For example, the ability of the elastic member 210 to extend as described herein may reduce the elastic member 210 from being separated from the frame 111.

According to one or more embodiments described herein, the electronic device 101 may provide the user with the holes 112 having various sizes corresponding to the thickness of the part 20 of the body of the user, by including the resizing structure 200 that is at least partially movable relative to the frame 111, according to the thickness of the part 20 of the body of the user on which the electronic device 101 is worn. The resizing structure 200 may be configured to adjust the size of the hole 112, by including the elastic member 210 including the first portion 211 and the third portion 213 movable relative to the frame 111. The elastic member 210 may reduce the elastic member 210 from being separated from the supporting member 220, by including the second portion 212 covered by the supporting member 220.

Figure 4A:
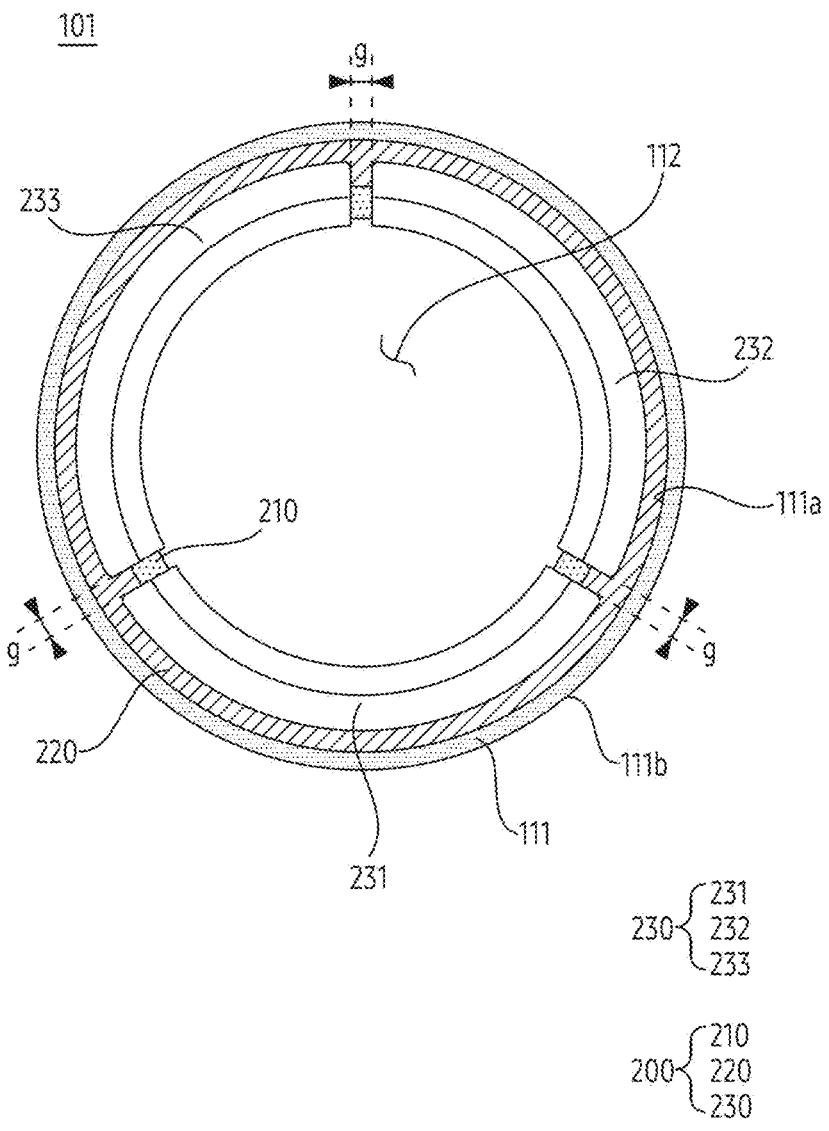
FIGS. 4A and 4B are top plan views of exemplary electronic devices.
Figure 4B:
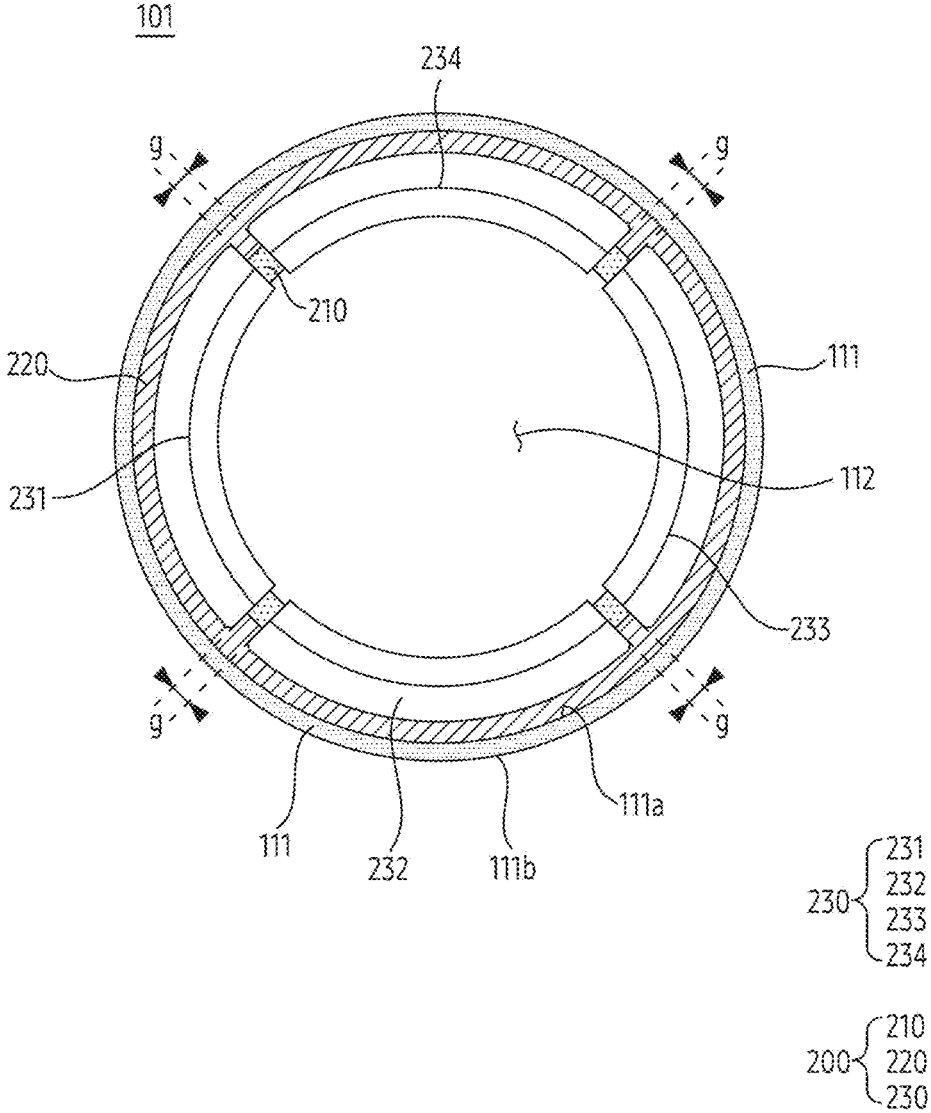

FIGS. 4A and 4B are top plan views of exemplary electronic devices.

Referring to FIGS. 4A and 4B, an electronic device 101 may include a frame 111 including a first surface 111a facing a part of a body of a user (e.g., a part 20 of the body of the user of FIG. 2A) when worn by the user, and a second surface 111b opposite to the first surface 111a. The electronic device 101 may include a resizing structure 200 on the first surface 111a that is at least partially movable relative to the frame 111 by being pressed by the part 20 of the body of the user. The resizing structure 200 may include an elastic member 210 that is deformable according to the shape of the part 20 of the body of the user, and a supporting member 220 that extends from the first surface 111a to cover at least a portion of the clastic member 210 and guides a deformation of the clastic member 210 by supporting the elastic member 210.

According to an embodiment, the resizing structure 200 may further include at least one fastening member 230 attached on the elastic member 20, and configured to apply pressure to the clastic member 210 by being in contact with the part 20 of the body of the user. The at least one fastening member 230 may include a plurality of fastening members spaced apart from each other at designated interval (e.g., a predetermined interval or spacing). The resizing structure 200 may further include gaps g between the plurality of fastening members exposing at least a portion of the elastic member 210.

For example, referring to FIG. 4A, the at least one fastening member 230 may include a first fastening member 231, a second fastening member 232, and a third fastening member 233 spaced apart from each other. Each of the first fastening member 231, the second fastening member 232, and the third fastening member 233 may provide the gaps g to the resizing structure 200, by being spaced apart from each other at designated interval. Since the resizing structure 200 includes the gaps g, the size of the hole 112 may be changed by movement relative to the frame 111 of each of the first fastening member 231, the second fastening member 232, and the third fastening member 233. For example, the first fastening member 231, the second fastening member 232, and the third fastening member 233 may have the same dimensions and/or same physical characteristics.

For example, referring to FIG. 4B, the at least one fastening member 230 may further include a fourth fastening member 234. However, embodiments supported by aspects of the present disclosure are not limited thereto. For example, as illustrated in FIGS. 2B and 2C, the resizing structure 200 may include eight fastening members spaced apart from each other. The electronic device 101 may include two or more fastening members attached to the elastic member 210 and spaced apart from each other at designated interval. The plurality of fastening members may provide the resizing structure 200 with a plurality of gaps, by being spaced apart from each other. Since the resizing structure 200 includes the plurality of gaps, the size of the hole 112 may be changed by movement of the plurality of fastening members. When each of the plurality of fastening members moves toward the first surface 111a of the frame 111, the size of the hole 112 may increase. When each of the plurality of fastening members is moved toward a part of the body of the user (e.g., the part 20 of the body of the user of FIG. 2A) on which the electronic device 101 is worn, the size of the hole 112 may decrease.

According to one or more embodiments of the present disclosure, It is to be understood that, for descriptions of multiple fastening members of the resizing structure 200, the fastening members may have the same dimensions and/or same physical characteristics. However, the present disclosure are not limited thereto, and for descriptions of multiple fastening members of the resizing structure 200, one or more fastening members of the resizing structure 200 may have dimensions and/or physical characteristics different from another fastening member of the resizing structure 200.

The electronic device 101 according to one or more embodiments described herein may provide the user with the hole 112 having various sizes corresponding to the thickness of the part 20 of the body of the user, by including the plurality of fastening members and the resizing structure 200 including the gaps g between the plurality of fastening members.

Figure 5A:
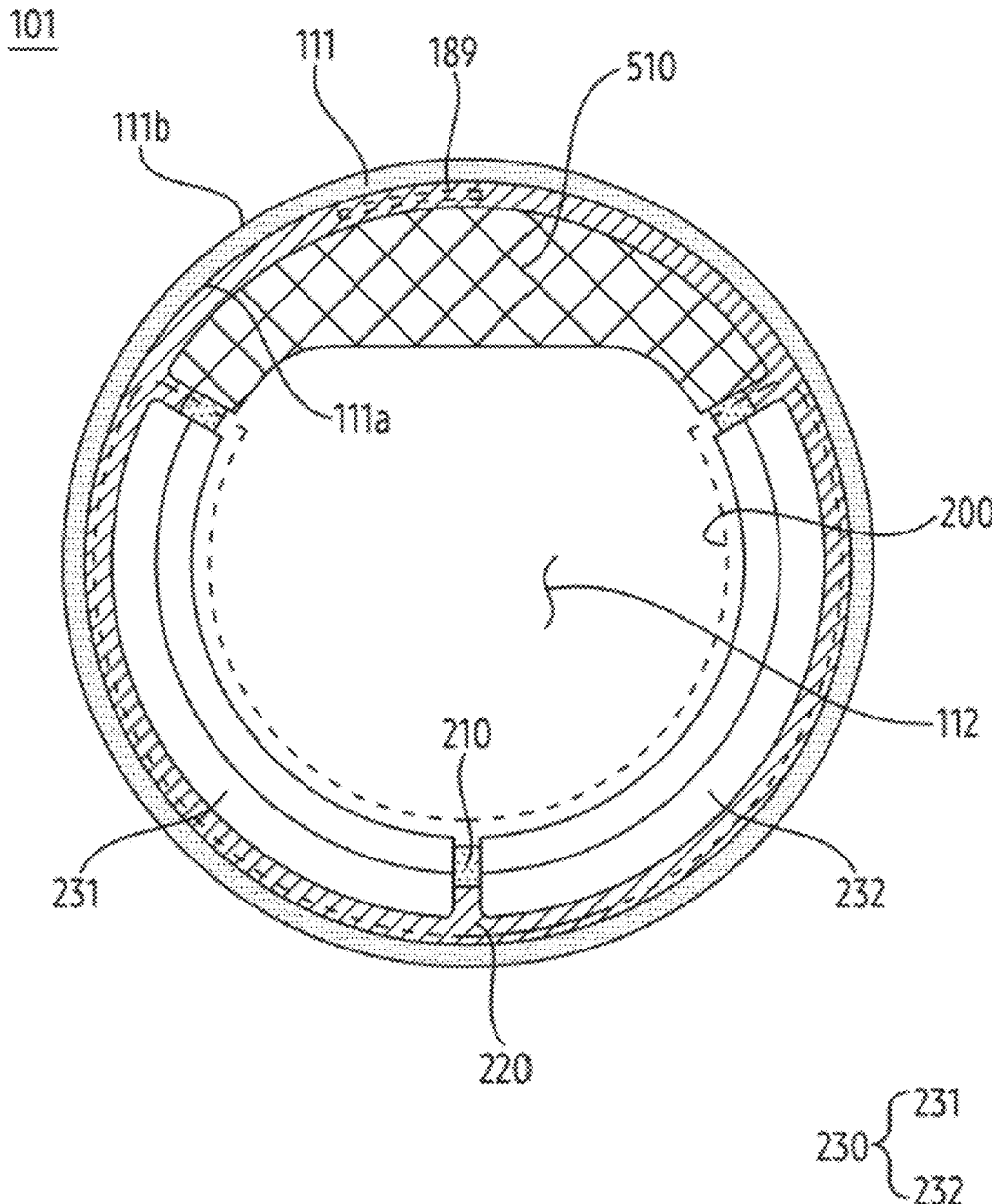
FIG. 5A is a top plan view of an exemplary electronic device.
Figure 5B:
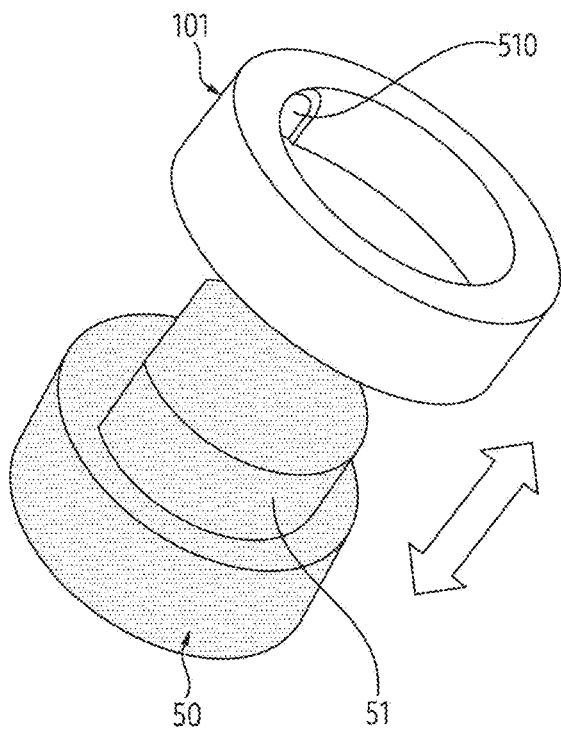
FIG. 5B illustrates a connection between an exemplary electronic device and an external electronic device.

FIG. 5A is a top plan view of an exemplary electronic device. FIG. 5B illustrates a connection between an exemplary electronic device and an external electronic device.

Referring to FIGS. 5A and 5B, an electronic device 101 may include a frame 111 including a first surface 111a facing a part of a body of a user (e.g., a part 20 of the body of the user of FIG. 2A) when worn by the user, and a second surface 111b opposite to the first surface 111a. The electronic device 101 may include a resizing structure 200 on the first surface 111a that is at least partially movable relative to the frame 111 by being pressed by the part 20 of the body of the user. The resizing structure 200 may include an elastic member 210 that is deformable according to the shape of the part 20 of the body of the user, and a supporting member 220 that extends from the first surface 111a to cover at least a portion of the elastic member 210 and guides a deformation of the clastic member 210 by supporting the elastic member 210. According to an embodiment, the resizing structure 200 may further include at least one fastening member 230 attached on the clastic member 210, and configured to apply pressure to the elastic member 210 by being in contact with the part 20 of the body of the user. According to an embodiment, the at least one fastening member 230 may include the first fastening member 231 and the second fastening member 232 that are spaced apart from each other.

According to an embodiment, the electronic device 101 may further include a supporting structure 510 extending from the resizing structure 200, and a battery (e.g., a battery 189 of FIG. 1) between the supporting structure 510 and the first surface 111a of the frame 111. For example, the supporting structure 510 may be fastened relative to the frame 111, unlike the resizing structure 200 that is at least partially movable relative to the frame 111 by the part 20 of the body of the user. For example, the supporting structure 510 may surround the battery 189 together with the frame 111. For example, the supporting structure 510 may have a shape different from the shape of the resizing structure 200. Since the supporting structure 510 is distinct from the resizing structure 200, the electronic device 101 may protect the battery 189 from external shock by the supporting structure 510 and may guide the location of the battery 189 to the user. For example, the supporting structure 510 is distinct from the resizing structure 200.

According to an embodiment, the supporting structure 510 may guide the connection between the electronic device 101 and an external electronic device 50 (e.g., an electronic device 102 of FIG. 1) for charging the electronic device 101. For example, the hole 112 of the electronic device 101 may allow the charging portion 51 of the external electronic device 50 to pass through. The external electronic device 50 may be configured to supply power to the electronic device 101 through the charging portion 51. The battery 189 may receive the power from the charging portion 51 through the supporting structure 510 disposed on the battery 189. By forming at least a portion of the hole 112, the supporting structure 510 may guide a direction and/or a location in which the hole 112 allows the charging portion 51 to passes through.

According to one or more embodiments described herein, the electronic device 101 may guide the location of the battery 189 to the user and may reduce damage to the battery 189 due to the external impact, by including the supporting structure 510 for protecting the battery 189.

According to the above-described embodiment, a wearable device (e.g., an electronic device 101 of FIG. 1) may comprise a frame (e.g., a frame 111 of FIG. 2B) including a first surface (e.g., a first surface 111a of FIG. 2B) facing a part (e.g., a part 20 of a body of a user of FIG. 2A) of body of a user when the wearable device is worn on the user, and a second surface (e.g., a second surface 111b of FIG. 2B) opposite to the first surface. The wearable device may comprise a resizing structure (e.g., a resizing structure 200 of FIG. 2B) on the first surface, wherein the resizing structure is at least partially movable relative to the frame in response to pressure from the part of the body of the user. The resizing structure may include an elastic member (e.g., an clastic member 210 of FIG. 2B) which is deformable according to a shape of the part of the body of the user. The resizing structure may include a supporting member (e.g., a supporting member 220 of FIG. 2B) guiding a deformation of the elastic member by supporting the elastic member and extending from the first surface to cover at least a portion of the elastic member. According to the above-mentioned embodiment, the wearable device may provide various user experiences to the user and may reduce the electronic device from being separated from a part of the body of the user, by including the resizing structure movable relative to the frame. The above-mentioned embodiment may have various effects including the above-mentioned effect.

According to an embodiment, the resizing structure may further include at least one fastening member (e.g., at least one fastening member 230 of FIG. 2B) attached to the elastic member and configured to press the elastic member based on contact with the part of the body of the user. According to the above-mentioned embodiment, the resizing structure may be configured such that the electronic device is fastened to the part of the body of the user through the at least one fastening member, when the electronic device is worn by the user by including the at least one fastening member. The above-mentioned embodiment may have various effects including the above-mentioned effect.

According to an embodiment, the at least one fastening member may include a plurality of fastening members (e.g., fastening members 231, 232, 233, and 234 of FIG. 4B) spaced apart from each other at designated interval. The resizing structure may further include gaps (e.g., gaps g of FIG. 4A) between the plurality of fastening members which is exposing at least a portion of the clastic member. According to the above-mentioned embodiment, the resizing structure may be configured such that the electronic device is fastened to the part of the body of the user by including the plurality of fastening members and the gaps. The above-mentioned embodiment may have various effects including the above-mentioned effect.

According to an embodiment, the at least one fastening member may be configured to be moved toward the first surface or toward the part of the body of the user by the deformation of the clastic member. According to the above-mentioned embodiment, the at least one fastening member may provide various user experiences to the user, by being configured to be moved by the clastic member. The above-mentioned embodiment may have various effects including the above-mentioned effect.

According to an embodiment, the supporting member may include a guide structure facing the first surface by protruding from the supporting member, the guide structure (e.g., a guide structure 225 of FIG. 3A) guiding movement of the elastic member according to the shape of the part of the body of the user. According to the above-mentioned embodiment, the supporting member may guide deformation of the clastic member and may reduce the clastic member from being separated from the supporting member, by including the guide structure. The above-mentioned embodiment may have various effects including the above-mentioned effect.

The electronic device according to an embodiment may further comprise a space (e.g., a space S of FIG. 2D) covered by the frame and the resizing structure, and a volume of the space may be configured to be changeable by the deformation of the clastic member. According to the above-mentioned embodiment, the electronic device may provide various user experiences to the user, by including the space in which the volume is configured to be changeable by the deformation of the clastic member. The above-mentioned embodiment may have various effects including the above-mentioned effect.

According to an embodiment, the resizing structure may further include at least one fastening member configured to press the elastic member in response to contact with the part of the body of the user and attached to the elastic member. The elastic member may include a first portion (e.g., a first portion 211 of FIG. 3A) contacting the at least one fastening member, a second portion (e.g., a second portion 212 of FIG. 3A) contacting the supporting member and disposed in the supporting member, and a third portion (e.g., a third portion 213 of FIG. 3A) facing the first surface by extending from the first portion to the second portion. According to the above-mentioned embodiment, the clastic member may be configured to move the at least one fastening member, by including the first portion. The elastic member may reduce the elastic member from being separated from the supporting member, by including the second portion. The elastic member may be configured to move at least a portion of the resizing structure by deformation of the third portion, by including the third portion. The above-mentioned embodiment may have various effects including the above-mentioned effect.

According to an embodiment, the third portion may be configured to move the at least one fastening member contacting the first portion toward the first surface or toward the part of the body of the user by being deformed according to a shape of the part of the body of the user. According to the above-mentioned embodiment, the elastic member may be configured to move at least a portion of the resizing structure by deformation of the third portion, by including the third portion. The above-mentioned embodiment may have various effects including the above-mentioned effect.

According to an embodiment, a width (e.g., a width w1 of FIG. 3A) of the first portion contacting the at least one fastening member may be greater than a width (e.g., a width w2 of FIG. 3A) of the second portion contacting the supporting member. According to the above-mentioned embodiment, as the width w1 is greater than the width w2, the clastic member may widen a surface supported by the supporting member and on which the at least one fastening member is seated. The above-mentioned embodiment may have various effects including the above-mentioned effect.

The electronic device according to an embodiment may further comprise a hole (e.g., a hole 112 of FIG. 2B) surrounded by the frame and configured to pass the part of the body of the user. The clastic member may include a third surface (e.g., a third surface 211a of FIG. 3A) forming at least a portion of the hole. A size of the hole may be configured to be changeable by a movement of a portion of the third surface. According to the above-mentioned embodiment, the elastic member may provide the hole having various sizes to correspond to the thickness of the part of the body of the user, by including the third surface. The above-mentioned embodiment may have various effects including the above-mentioned effect.

According to an embodiment, the supporting member may include a first supporting member (e.g., a first supporting member 221 of FIG. 3A), a second supporting member (e.g., a second supporting member 222 of FIG. 3A) spaced apart from the first supporting member and facing the first supporting member. The elastic member may extend from the first surface between the first supporting member and the second supporting member to the third surface. According to the above-mentioned embodiment, the supporting member may reduce the elastic member from being separated from the supporting member and may support the elastic member, by including the first supporting member and the second supporting member. The above-mentioned embodiment may have various effects including the above-mentioned effect.

The electronic device according to an embodiment may further comprise a sensor on the first surface configured to detect a condition of the user by using the part of the body of the user. According to the above-mentioned embodiment, the electronic device may provide information related to the condition of the user to the user by using the part of the body of the user, by including the sensor. The above-mentioned embodiment may have various effects including the above-mentioned effect.

According to an embodiment, the wearable device may further comprise a shielding member (e.g., a shielding member 115 of FIG. 2B) disposed on the sensor (e.g., a sensor module 176 of FIG. 1) and including at least one protrusion (e.g., a first protrusion 115a, a second protrusion 115b, and a third protrusion 115c of FIG. 2B) exposed to an outside of the electronic device for the sensor. The resizing structure may further include at least one opening (e.g., at least one opening 250 of FIG. 2C) penetrated by the at least one protrusion. According to the above-mentioned embodiment, the electronic device may improve the performance of the sensor by including the shielding member including the at least one protrusion. The above-mentioned embodiment may have various effects including the above-mentioned effect.

The electronic device according to an embodiment may further comprise a supporting structure (e.g., a supporting structure 510 of FIG. 5A) extending from the resizing structure, and a battery (e.g., a battery 189 of FIG. 1) between the supporting structure and the first surface. According to the above-mentioned embodiment, the electronic device may guide the location of the battery to the user and may reduce damage to the battery due to external impact, by including the supporting structure. The above-mentioned embodiment may have various effects including the above-mentioned effect.

According to an embodiment, the clastic member may include at least one of rubber, and silicone. The frame may include titanium. According to the above-mentioned embodiment, the elastic member may provide various user experiences to the user by being deformable by the part of the body of the user. The frame may reduce the resizing structure from being separated from the frame, by supporting the resizing structure. The above-mentioned embodiment may have various effects including the above-mentioned effect.

According to an embodiment, a wearable device may comprise a frame including a first surface facing a part of a body of a user when the wearable device is worn on the user, and a second surface opposite to the first surface. The wearable device may comprise a resizing structure on the first surface, wherein the resizing structure is at least partially movable relative to the frame in response to pressure from the part of the body of the user. The wearable device may comprise a supporting structure extending from the resizing structure. The wearable device may comprise a battery between the supporting structure and the first surface. The resizing structure may include an elastic member which is deformable according to a shape of the part of the body of the user. The resizing structure may include a supporting member guiding a deformation of the clastic member by supporting the clastic member and extending from the first surface to cover at least a portion of the elastic member. The resizing structure may include at least one fastening member attached to the clastic member and configured to press the elastic member by contacting the part of the body of the user. According to the above-mentioned embodiment, the wearable device may provide various user experiences to the user and may reduce the electronic device from being separated from a part of the body of the user, by including the resizing structure movable relative to the frame. The resizing structure may be configured such that the electronic device is fastened to the part of the body of the user through the at least one fastening member, when the electronic device is worn by the user by including the at least one fastening member. The electronic device may guide the location of the battery to the user and may reduce damage to the battery due to external impact, by including the supporting structure. The above-mentioned embodiment may have various effects including the above-mentioned effect.

According to an embodiment, the at least one fastening member may include a plurality of fastening members spaced apart from each other at designated interval. The resizing structure further may further include gaps between the plurality of fastening members which is exposing at least a portion of the elastic member. According to the above-mentioned embodiment, the resizing structure may be configured such that the electronic device is fastened to the part of the body of the user by including the plurality of fastening members and the gaps. The above-mentioned embodiment may have various effects including the above-mentioned effect.

The electronic device according to an embodiment may further include a space covered by the frame and the resizing structure. A volume of the space may be configured to be changeable by the deformation of the elastic member. According to the above-mentioned embodiment, the electronic device may provide various user experiences to the user, by including the space in which the volume is configured to be changeable by the deformation of the elastic member. The above-mentioned embodiment may have various effects including the above-mentioned effect.

According to an embodiment, the elastic member may include a first portion contacting the at least one fastening member, a second portion contacting the supporting member and disposed in the supporting member, and a third portion facing the first surface by extending from the first portion to the second portion. According to the above-mentioned embodiment, the clastic member may be configured to move the at least one fastening member, by including the first portion. The elastic member may reduce the clastic member from being separated from the supporting member, by including the second portion. The elastic member may be configured to move at least a portion of the resizing structure by deformation of the third portion, by including the third portion. The above-mentioned embodiment may have various effects including the above-mentioned effect.

According to an embodiment, the third portion is configured to move the at least one fastening member contacting the first portion toward the first surface or toward the part of the body of the user by being deformed according to a shape of the part of the body of the user. According to the above-mentioned embodiment, the clastic member may be configured to move at least a portion of the resizing structure by deformation of the third portion, by including the third portion. The above-mentioned embodiment may have various effects including the above-mentioned effect.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic,"

"logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:
1. A wearable device comprising:

a frame including a first surface facing a part of a body of a user when the wearable device is worn on the user, and a second surface opposite to the first surface; and a resizing structure disposed on the first surface and including:

a supporting member, supported by the frame, including a distal end portion spaced apart from the frame, an elastic member at least partially disposed on the distal end portion of the supporting member to be retracted toward the first surface of the frame when the wearable device is worn on a finger of the user, and at least one fastening member attached to the elastic member and configured to press the elastic member based on contact with the part of the body of the user, wherein the at least one fastening member includes a plurality of fastening members spaced apart from each other at designated interval, and wherein the resizing structure further includes gaps between the plurality of fastening members which expose at least a portion of the elastic member.

2. The wearable device of claim 1, wherein the at least one fastening member is configured to be moved toward the first surface or toward the part of the body of the user by deformation of the elastic member.

3. The wearable device of claim 1, wherein the supporting member includes a guide structure facing the first surface by protruding from the supporting member, the guide structure guiding movement of the elastic member according to the shape of the part of the body of the user.

4. The wearable device of claim 1 further comprising:

a space covered by the frame and the resizing structure, wherein a volume of the space is configured to be changeable by deformation of the elastic member.

5. The wearable device of claim 1, wherein the resizing structure further includes at least one fastening member configured to press the elastic member in response to contact with the part of the body of the user, wherein the at least one fastening member is attached to the elastic member, and wherein the elastic member includes:

a first portion contacting the at least one fastening member;

a second portion contacting the supporting member and disposed in the supporting member; and a third portion facing the first surface and extending from the first portion to the second portion.

6. The wearable device of claim 5, wherein the third portion is configured to move the at least one fastening member contacting the first portion toward the first surface or toward the part of the body of the user by being deformed according to a shape of the part of the body of the user.

7. The wearable device of claim 5, wherein a width of the first portion contacting the at least one fastening member is greater than a width of the second portion contacting the supporting member.

8. The wearable device of claim 1 further comprising:

a hole surrounded by the frame and configured to pass the part of the body of the user, wherein the elastic member includes a third surface forming at least a portion of the hole, and wherein a size of the hole is configured to be changeable by a movement of a portion of the third surface.

9. The wearable device of claim 8, wherein the supporting member includes:

a first supporting member; and a second supporting member spaced apart from the first supporting member and facing the first supporting member; and, wherein the elastic member extends from the first surface between the first supporting member and the second supporting member to the third surface.

10. The wearable device of claim 1 further comprising:

a sensor on the first surface configured to detect a condition of the user by using the part of the body of the user.

11. The wearable device of claim 10 further comprising:

a shielding member disposed on the sensor and including at least one protrusion exposed to an outside of the wearable device for the sensor, wherein the resizing structure further includes at least one opening penetrated by the at least one protrusion.

12. The wearable device of claim 1 further comprising:

a supporting structure extending from the resizing structure; and a battery between the supporting structure and the first surface.

13. The wearable device of claim 1, wherein the elastic member includes at least one of rubber and silicone, and wherein the frame includes titanium.

14. A wearable device comprising:

a frame including:

a first surface facing a part of a body of a user when the wearable device is worn on the user, and a second surface opposite to the first surface;

a resizing structure on the first surface, wherein the resizing structure is at least partially movable relative to the frame in response to pressure from the part of the body of the user;

a supporting structure extending from the resizing structure; and a battery between the supporting structure and the first surface, wherein the resizing structure includes:

an elastic member which is deformable according to a shape of the part of the body of the user;

a supporting member guiding a deformation of the elastic member by supporting the elastic member, wherein the supporting member extends from the first surface to cover at least a portion of the elastic member; and at least one fastening member attached to the elastic member and configured to press the elastic member by contacting the part of the body of the user.

15. The wearable device of claim 14, wherein the at least one fastening member includes a plurality of fastening members spaced apart from each other at designated interval, and wherein the resizing structure further includes gaps between the plurality of fastening members which exposing at least a portion of the elastic member.

16. The wearable device of claim 14 further comprising:

a space covered by the frame and the resizing structure, wherein a volume of the space is configured to be changeable by the deformation of the elastic member.

17. The wearable device of claim 14, wherein the elastic member includes:

a first portion contacting the at least one fastening member;

a second portion contacting the supporting member and disposed in the supporting member; and a third portion facing the first surface by extending from the first portion to the second portion.

18. The wearable device of claim 17, wherein the third portion is configured to move the at least one fastening member contacting the first portion toward the first surface or toward the part of body of the user by being deformed according to a shape of the part of body of the user.

* * * * *